INVENTORS:
CAREL J. BREUKINK
JACOB VERMEULEN
AREND VAN DER ZWAN
BY:
THEIR ATTORNEY

United States Patent Office 3,542,909
Patented Nov. 24, 1970

3,542,909
PRODUCTION OF FIBROUS FILAMENTOUS PRODUCTS
Carel J. Breukink, Delft, Netherlands, Jacob Vermeulen, Redondo Beach, Calif., and Arend van der Zwan, Delft, Netherlands, assignors to Shell Oil Company, New York, N.Y., a corporation of Delaware
Filed July 20, 1967, Ser. No. 654,694
Claims priority, application Netherlands, Aug. 2, 1966, 6610834
Int. Cl. B29c 17/02, 25/00
U.S. Cl. 264—53
5 Claims

ABSTRACT OF THE DISCLOSURE

An improvement in the method for converting foamed polyolefin strands to fibrillated filamentous strands comprises extruding a foamable polyolefin mixture through an orifice at conditions at which the extrudate expands to a maximum cross-sectional area and thereafter shrinks by at least 25% in cross-sectional area, and stretching the strand in a ratio of at least 5:1 after it has shrunk and completely solidified.

---

The invention relates to the production of fibrous, filamentous products by stretching cellular strips or rods of predominantly stereospecific polyolefins, in particular polypropylene.

A process for the preparation of foamed cellular filaments by stretching foamed polyolefins is known from British Pat. 927,582 and equivalent U.S. 3,214,234 to Bottomley. It was found, however, that the processes of these patents do not yield satisfactory results when the density of the foam before stretching is below 300 g./l. At these low densities it is not possible to stretch the foam, as extruded, in the desired ratios since breaking repeatedly occurs.

Copending co-assigned U.S. patent application 574,932 of Gouw et al., filed Aug. 25, 1966, now U.S. 3,480,507 discloses a process for the preparation of fibrous, filamentous products by stretching strips or rods of foam, having a density below 300 g./l. of predominantly stereospecific polyolefins, in which, before stretching, the strips or rods of foam are compressed to a thickness which is at most half the original thickness.

It has now been found that when stretching foamed, predominantly stereospecific polyolefins having a density below 300 g./l., it is also possible to obtain strong fibrous, filamentous products without the compression described in said Gouw et al. patent if the foam meets the requirement of shrinking, after extrusion, to the degree defined below.

The invention is illustrated by the drawing, wherein:

FIG. 1 is a simplified schematic representation of a method of practicing this invention; and FIGS. 2 and 6 are drawings and FIGS. 3, 4, and 5 are photomicrographs of sections of polymer strands at different stages of the process.

According to this invention, fibrous, filamentous products are obtained by stretching strips or rods of foam of predominantly stereospecific polyolefins, the starting material being foam having a density below 300 g./l. which, after extrusion and after the cross-sectional area normal to the direction of extrusion has assumed a maximum value, shows a shrinkage upon cooling which, measured as a percentage of the said area, is at least 25.

Strips or rods are the appropriate form in which the foam is preeminently suited to being subjected to the treatment according to the invention. In general, the length of these strips or rods is at least 20 times the width and the thickness. The process according to the invention is preferably applied to "endless" strips or rods of foamed polyolefin obtained by extrusion. The designation "rod" is particularly used for foamed bodies of rounded, approximately circular cross-section obtained directly by extrusion through an orifice of substantially circular cross-section.

While this invention is applicable to various stereospecific polyolefins, it is of primary interest in the production of foamed filamentous articles from stereoregular, and particularly from predominantly isotactic polypropylene, for which methods of preparation and properties are now well known. Polypropylene of commerce is suitable for use in this invention.

Foamed strips or rods are obtained by a process in which a foamable mixture is extruded in plastic condition. Suitable are processes in which the foam is extruded from an extruder in which a volatile liquid, generally a hydrocarbon, such as propane, butane or pentane or a halogen compound, for example, trichlorofluoromethane is injected as blowing agent into the polyolefin. According to other methods, inert gases, such as nitrogen or carbon dioxide, are used as blowing agents. Inert gases can also be formed in the polyolefin mass by a chemical reaction, for example, by decomposing certain organic nitrogen compounds, some of which are commercially available blowing agents, or by reacting sodium bicarbonate with a solid acid, such as tartaric acid. Volatile liquids and gases may be designated "physical blowing agents." It is often very favorable to use a chemical blowing agent which decomposes to emit a gas, for example, a nitrogen compound, together with a volatile liquid. It is, however, easier to obtain a foam having a low density by evaporating a volatile liquid than by means of a blowing agent formed by a chemical reaction.

Strips or rods of freshly extruded foamed polyolefins of low-density (below 300 g./l.) result in an attractive fibrous filamentous product by treatment according to this invention. The resulting filament or strand is composed of longitudinally oriented, elongated, locally branched structural fibrous elements which are interconnected to a great extent by likewise longitudinally oriented branchings. Thus, this product possesses a structure which may be described as fibrous. On the other hand, when stretching a polyolefin foam having a high density, a product is obtained in which the original cellular structure is still present in elongated form. With products of equal strength, the one prepared from the polyolefin foam having the lower density is highly advantageous both because of its lower weight per unit of length and of its fibrous character.

During extrusion of a foamable polyolefin composite through a circular orifice, the rod leaving the extrusion orifice at first shows an increase in cross-sectional area up to a maximum. In the prior art it was common practice to effect the extrusion of foamed rods in such a way that the cross-sections of these rods remained constant after reaching their maximum dimension. The conditions prevailing during extrusion are, according to this invention, selected in such a way that, after reachng its maximum, the cross-sectional area decreases again, the surface of the foamed rod becoming wrinkled.

Whether a foamed rod having a non-shrinking or a shrinking cross-section is formed during extrusion is determined primarily by the temperature during extrusion. If a certain temperature limit, the magnitude of which depends on the composition of the mixture being extruded, is exceeded during extrusion, the shrinking phenomenon begins to occur. This temperature is referred to herein as the "initial shrinking temperature." The extent to which the foam rod shrinks is greater according as the extrusion temperature is higher than this initial shrinking temperature. An increase in the extrusion temperature of a few degrees centigrade, for example 3° C. to 7° C., above the initial shrinking temperature is often sufficient to obtain a foamed rod which shrinks sufficiently to be suitable for use according to the invention. A further increase in the extrusion temperature soon results in great losses of blowing agent, as a result of which the favorable effect of the quantity of blowing agent used, sharply declines. For this reason, extrusion temperatures which are more than 10° C. higher than the said initial shrinking temperature limit are not normally used.

In addition, the concentration of the blowing agent is also of importance for the preparation of shrinking foam. In order to produce an adequate effect, a concentration of 5% by weight of physical blowing agent, based on polyolefin, should in practice be considered as a minimum. If more than 25% by weight of physical agent is used, the extrusion becomes irregular; the diameter of the resultant strand is then subject to change, and the rod may even break at times, or the foam may be produced in the form of shreds.

The preferred degree of shrinkage is determined by the nature of the polyolefin and also by the nature of the blowing agent used. Thus, when pentane is used as blowing agent, a stronger shrinkage (for example 10% more) is recommended than when using butane. In the process of this invention the preferred lower limit of shrinkage in area is 40%. A generally suitable range is from 50 to 60%.

The shrinkage in area, in percent of original area, is defined by the formula $$\text{shrinkage} = \frac{A_m - A_f}{A_m} \times 100$$

wherein $A_m$ is the maximum cross-sectioned area, immediately upon expansion, and $A_f$ is the final cross-sectional area after completion of shrinking and solidification of the extrudate. The area $A_f$ for strips to be converted according to this invention is suitably in the range from 10 to 1000 mm.$^2$.

Favorable for the formation of a shrinking foamed rod, suitable for being stretched according to this invention, is a length-to-diameter ratio of the extrusion orifice of at most 4:1.

The advantages of the process according to this invention are greatest when starting from polypropylene foam having a density between 15 and 150 g./l.

Cooling of the foamed rod after the extrusion during which shrinking occurs may be affected in the air, but also in a liquid bath, for example a water bath.

Stretching of the foam is preferably effected at temperatures between approximately 80° C. and the melting point of the polyolefin. For polypropylene this melting point is generally between 165° C. and 170° C. A suitable apparatus for heating the foamed rods is a tube or tunnel through which the foam is passed and in which it is in contact with a hot gas. When foamed polypropylene is being heated the temperature of the gas will generally be between 110° C. and 180° C. The residence time of the foam in the heating apparatus is suitably between 1 second and 5 minutes. This time may be shorter as the temperature selected is higher. A noticeable increase in the ratio to which the foamed rod can be stretched may occur when the material is heated for several seconds to temperatures between 130° C. and 170° C.

The stretching ratios must be chosen in dependence on the nature, in particular the density, of the foam and the degree of shrinkage. These factors determine what stretching ratios are required to convert the cellular structure into the fibrous structure and also what stretching ratios yield the most favorable results. These most favorable stretching ratios can be easily found experimentally in each case. In addition to being dependent on the nature of the foam and the degree of shrinkage, the maximum stretching ratio, i.e., the stretching ratio above which breaking or weak spots occur, is also affected by the heating applied during stretching. Suitable stretching ratios are generally above 5:1, for example, between 8.1 and 15:1.

Stretching of the foam is preferably effected directly following extrusion, i.e., without intermediate winding of the foamed strand onto a spool or reel.

After stretching of the foamed rods according to the invention, the product usually has a smooth surface. If desired, this surface can be broken, split or fibrillated by a treatment with pins, needles or stiff wires, which may suitably be mounted on rotating rolls. By this treatment the mutual cohesion of the filaments, the fullness and the resemblance to other known textile materials can be further improved.

The fibrous, filamentous products which are obtained according to the invention, show a high volume per unit of weight. This property is of great importance for the manufacture of light-weight fabrics which, in other properties and in appearance, strongly resemble fabrics manufactured from heavier filaments. In this connection the invention is also considered to be embodied in fabrics which are completely or partly composed of the fibrous, filamentous products obtained according to the invention. What is said here in relation to fabrics also applies to non-woven fabrics, i.e., structures which are produced not by weaving but by interconnecting, in a manner other than weaving, loose fibers or filaments spread out to form a flat surface, these loose fibers or filaments being completely or partly the fibrous, filimentous products which are obtained according to the invention.

Staple fibers can be suitably isolated from the fibrous, filamentous products obtained according to the invention by separating out, i.e., by such operations as cutting, breaking, tearing or rubbing. The staple fibers can be worked up to yearns of very great strength by twining. Because of their coarse, fibrous nature the staple fibers obtained according to the invention in this way are more suitable for the manufacture of yarns than the known staple fibers which are artificial fibers with a smooth surface and which need a very strong twine.

The apparatus illustrated in FIG. 1 consists of an extrusion die 1, two sets of godet rolls, 3 and 5, and a heating means, such as an oven 4.

According to this invention, a foamable polyolefin melt is extruded from die 1 through a circular orifice. At point $a$, just beyond the die orifice, its diameter is essentially that of the die orifice. It expands rapidly as the blowing agent is released and reaches a miximum diameter at point $b$. Thereafter, the extrudate, which is still above its solidification temperature, gradually shrinks until it reaches a constant diameter at point $c$. The extrudate has been cooled to its solidification temperature at point $c$ or beyond. Thereafter it passes over godet rolls 3, which operate at a speed that permits the extrudate to be pulled away from the extruder die without a substantial amount of stretching. The extrudate passes through oven 4 and over godet rolls 5, which operate at a predetermined faster rate than rolls 3 to provide the desired stretching ratio. The extrudate is stretched while in oven 4. It leaves oven 4 in the form of a plexifilament and passes over godet rolls 5 to take-up equipment, not shown.

EXAMPLE

Figure 1:
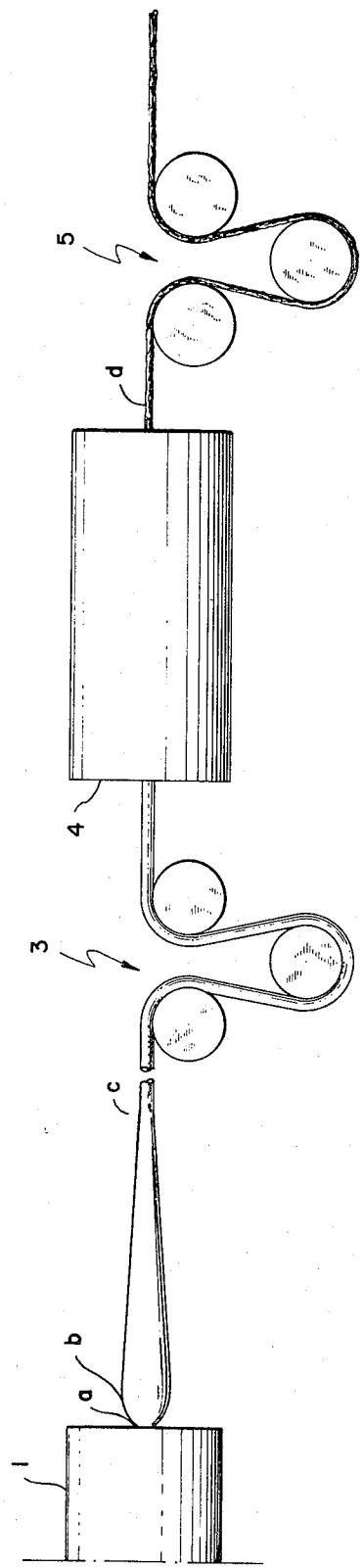
Figure 2:
FIG. 2 is a drawing of a section through the strand at point $a$.
Figure 3:
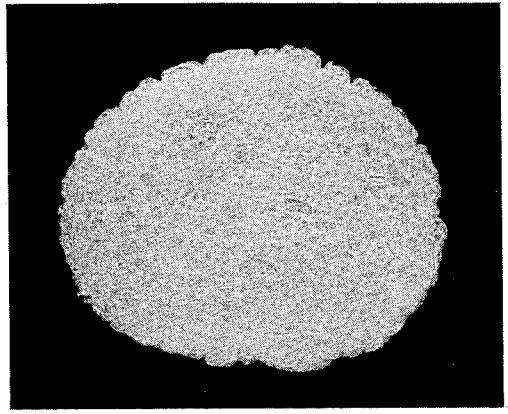
FIGS. 3 and 4 are photomicrographs, about 10 times enlarged in the original, of sections taken through the strand at points $b$ and $c$, respectively.
Figure 4:
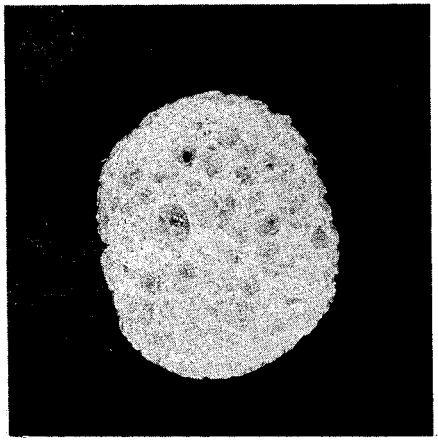
Figure 5:
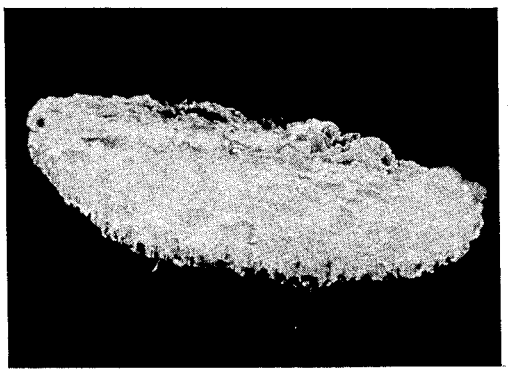
FIG. 5 is a photomicrograph, about 30 times enlarged in the original, of a cross-section of the strand at point $d$.
Figure 6:
FIG. 6 is a drawing of the appearance of a portion of FIG. 5 at a total enlargement of about 150 times.

To obtain the foam an extruder was used of which the cylinder shell had an inside diamener D=60 mm. and a length (from the feed inlet for the polymer to the extrusion orifice) of 32D. This length was divided into a feed and plasticizing zone (11D), a compression zone (1D), a pumping or "metering" zone (10D), a mixing zone (5D) and a cooling zone (5D). The rotating shaft in the feed zone, the compression zone and the pumping zone had the form of a worm screw. The distance between the shaft and the cylinder shell was 10 mm. in the feed zone and 3 mm. in the metering zone. In the compression zone this distance gradually diminished from 10 to 3 mm. In the mixing zone the shaft was provided with a number of collars having a total number of twenty 3 mm.-deep helical grooves. In the cooling zone the distance from the shaft to the cylinder shell was 6 mm. Two scraper blades were arranged in this zone.

The die head of the extruder contained 4 circular orifices, each having a diameter of 1 mm. The length of each extrusion orifice (in the direction of extrusion) was 3 mm.

The polymer was isotactic polypropylene with a melt index of 8. Before being introduced into the extruder this polymer was moistened with 0.1% by weight of paraffin oil and mixed with 0.25% by weight of NaHCO₃ and 0.20% by weight of citric acid. The moistening with paraffin oil served to give NaHCO₃ and citric acid better adhesion to the polymer granules.

In addition to the blowing agent activated by chemical reaction, either butane or isopentane was used as physical blowing agent, which was injected at the beginning of the mixing zone.

The extruded foamed rods were allowed to shrink in the air. Whenever possible, stretching was effected in an oven in which the air temperature was 121° C. and into which the foamed rod was passed at a rate of 3 mm. per minute.

COMPARATIVE EXAMPLE A

The extruder was set as follows:
Speed: 18 r.p.m.
Temperature of the cylinder shell
  At the feed zone: 180° C.
  At the metering zone: 180° C.–185° C.
  At the mixing zone: 155° C.
  At the cooling zone: 150° C.
  At the die head: 155° C.
Physical blowing agent: technical-grade butane.
Injection pressure: 120 kg./cm.²
Blowing agent content: 20% (based on polymer).
These conditions gave the following results:
Yield: 9 kg./h.
Foam temperature
  (at the die head): 161° C.
Shrinkage: 24%.
Outward appearance surface:
Diameter after shrinkage: 7 mm.
Density after shrinkage: 25 g./l.
Average cell size after shrinkage: 0.4 mm.
Stretchability: unstretchable.

EXAMPLE I

Conditions as in Example A, with the following differences:

Temperature of the cylinder shell in the cooling zone: 151° C.
Blowing agent content: 18%
Results:
  Temperature of the foam at the die head: 162° C.
  Shrinkage: 30%
  Outward appearance of the surface: not smooth
  Permissible stretching ratio: 9:1
  Density after shrinkage: 28 g./l.
  Density after stretching: 107 g./l.

At a stretching ratio of 8:1 it was possible to operate for many hours without break occurring.

EXAMPLE II

Conditions as in Example I, but with a further reduction in cooling.
Results:
  Temperature of the foam at the die head: 164° C.
  Shrinkage: 65%.
  Outward appearance of the surface: wrinkled.
  Permissible stretching ratio: 13:1.
  Density after shrinkage: 34 g./l.
  Density after stretching: 178 g./l.

EXAMPLES B (FOR COMPARISON), III AND IV

Isopentane was used as physical blowing agent. With variation of the conditions as specified below and under otherwise identical conditions the following results were obtained:

| Test No. | Isopentane percent (based on polymer) | Temperature at the die head, ° C. | Shrinkage percent | Permissible stretching ratio | Density after shrinkage, g./l. | Density after stretching, g./l. |
|---|---|---|---|---|---|---|
| B | 23 | 158 | 3 | None | 45 | |
| III | 21 | 164 | 26 | 5=1 | 30 | 140 |
| IV | 21 | 166 | 60 | >10=1 | 45 | 188 |

The stretched, fibrous product of the numbered examples had the following properties:

| Example No. | Denier, g./9,000 m. | Tenacity, g./den. |
|---|---|---|
| I | 1,100 | 2.0 |
| II | 950 | 2.8 |
| III | 1,500 | 1.3 |
| IV | 1,020 | 2.7 |

The fibrous flamentous articles of this invention may be designated plexifilaments, since their internal structure is a three-dimensional plexus consisting of a multitude of essentially longitudinally extended interconnected fibrous elements or film-fibrils. Plexifilaments produced according to this invention may contain an average of the order of fifty filaments per millimeter of original strand thickness.

We claim as our invention:

1. In the process of producing filamentous polyolefin product by stretching rods of foam of prevailing stereoregular polyolefin, the steps of extruding a rod of foamable polyolefin composition containing from 5 to 25% by weight of physical blowing agent, based on polyolefin, at a temperature above but within about 10° C. of the "initial shrinking temperature" of said foam, the values in said ranges being selected to result in foamed extruded rod which first expands to a maximum cross-sectional area and immediately thereafter shrinks to a cross-sectional area at least 25% less than said maximum cross-sectional area and a foam density of less than 300 g./l., and stretching said shrunk and solidified rod at a stretching ratio of at least 5:1.

2. A process according to claim 1 wherein said polyolefin is prevailing isotactic polypropylene, said foam, upon solidification has a density between 15 and 150 g./l., and a cross sectional area which is at least 40% less than said maximum cross-sectional area, and said stretching ratio is between 8:1 and 15:1.

3. A process according to claim 1 wherein said shrinkage in cross-sectional area is at least 40%.

4. A process according to claim 1 wherein said rod is extruded through a substantially circular orifice having a length to diameter ratio not exceeding 4:1.

5. A process according to claim 2 wherein said stretching is effected at temperatures between 110° C. and 180° C.

References Cited

UNITED STATES PATENTS

| | | | |
|---|---|---|---|
| 3,118,161 | 1/1964 | Cramton | 264—54 XR |
| 3,214,234 | 10/1965 | Bottomley | 264—54 XR |
| 3,303,045 | 2/1967 | Newman | 264—54 XR |
| 3,403,203 | 9/1968 | Schirmer | 264—321 XR |
| 3,411,979 | 11/1968 | Lewis | 264—54 XR |
| 3,422,171 | 1/1969 | Oppenlander | 264—51 |

PHILIP E. ANDERSON, Primary Examiner

U.S. Cl. X.R.

161—178; 260—2.5; 264—177, 290, 342